United States Patent [19]

Brandt et al.

[11] 4,396,433

[45] Aug. 2, 1983

[54] CELLULOSE ETHER-BASED GEL-FORMING COMPOSITION AND METHODS OF USE AND PREPARATION THEREOF

[75] Inventors: Lothar Brandt; Arno Holst, both of Wiesbaden, Fed. Rep. of Germany

[73] Assignee: Hoechst Aktiengesellschaft, Frankfurt am Main, Fed. Rep. of Germany

[21] Appl. No.: 363,042

[22] Filed: Mar. 29, 1982

[30] Foreign Application Priority Data

Mar. 31, 1981 [DE] Fed. Rep. of Germany ....... 3112946

[51] Int. Cl.³ .......................... C08B 11/93; C08L 1/08
[52] U.S. Cl. .................................... 106/194; 166/294; 536/84; 536/91; 536/96
[58] Field of Search ................. 106/177, 194; 536/84, 536/95–98; 166/294, 295

[56] References Cited

U.S. PATENT DOCUMENTS

| | | | |
|---|---|---|---|
| 2,420,949 | 5/1947 | Hager et al. | 260/232 |
| 2,439,833 | 4/1948 | Wagner | 166/22 |
| 3,804,174 | 4/1974 | Chatterji et al. | 166/293 |
| 3,971,440 | 7/1976 | Hessert et al. | 166/270 |
| 4,001,210 | 1/1977 | Engelskirchen et al. | 536/95 |
| 4,012,328 | 3/1977 | Hunter et al. | 166/294 |
| 4,018,286 | 4/1977 | Gall et al. | 166/294 |
| 4,035,195 | 7/1977 | Podlas | 106/194 |
| 4,039,029 | 8/1977 | Gall | 166/294 |
| 4,096,074 | 6/1978 | Stournas | 252/8.55 |
| 4,096,326 | 6/1978 | Reid | 536/95 |
| 4,183,765 | 1/1980 | Podlas | 106/187 |
| 4,265,673 | 5/1981 | Pace et al. | 106/194 |
| 4,358,587 | 11/1982 | Brandt et al. | 536/91 |

FOREIGN PATENT DOCUMENTS

| | | |
|---|---|---|
| 7012 | 1/1980 | European Pat. Off. . |
| 7013 | 1/1980 | European Pat. Off. . |
| 51181 | 5/1982 | European Pat. Off. . |
| 1503897 | 3/1978 | United Kingdom . |

*Primary Examiner*—Theodore Morris
*Attorney, Agent, or Firm*—Schwartz, Jeffery, Schwaab, Mack, Blumenthal & Koch

[57] ABSTRACT

The application discloses a gel-forming composition based on (a) water, (b) a water-soluble cellulose mixed ether having at least one nonionic substituent from the group comprising hydroxyalkyl and alkyl and at least one anionic phosphorus-containing substituent, and (c) a salt containing a cation which is at least divalent. The phosphorus-containing substituent is a phosphonoalkyl group or a p-alkylphosphinoalkyl group. The application also relates to a process for the preparation of a gel from this composition, to the reversible reversing of the gel by the addition of an agent which complexes the cation, e.g. in the case of $Al^{3+}$ ions, $Fe^{3+}$ ions, $Zr^{4+}$ ions or $ZrO^{2+}$ ions, by means of an amount of fluoride ions, and to the use of this gel-forming compostion in the secondary production of petroleum.

16 Claims, No Drawings

CELLULOSE ETHER-BASED GEL-FORMING COMPOSITION AND METHODS OF USE AND PREPARATION THEREOF

BACKGROUND OF THE INVENTION

The present invention relates to a gel-forming composition based on (a) water, (b) a water-soluble cellulose mixed ether having at least one phosphorus-containing ether substituent and (c) a salt having a crosslinking action. Furthermore, the invention comprises a process for the preparation of a gel from this composition, a process for the reversible reversal of the gel thus produced and the use of the gel-forming composition in the secondary production of petroleum.

Commercially available types of water-soluble cellulose ethers exhibit Newtonian or non-Newtonian flow behavior in aqueous solution, as a function, inter alia, of their average viscosity values. Without special modifications they have, in general, no or only a very small thixotropic flow or gel-formation tendency within the concentration range of up to 2%, which is very common in practice and within which viscosities of up to more than $10^5$ mPas (measured by the Hoppler method at 20° C. in a 2% strength aqueous solution) can be achieved. It may be assumed that in these aqueous solutions the dissolved polymeric cellulose ether molecules form only weak hydrogen bonds among one another, the bond strength of which is insufficient to impart a gel-like structure to the aqueous system. Depending on the type of cellulose ether, the addition of certain modifying additives to the aqueous solution can initiate chemical crosslinking reactions producing stable chemical bonds between individual or several cellulose ether polymer chains, which bonds lead to the formation of a stable gel structure throughout the entire volume of the aqueous system. If the concentration in the aqueous system of the cellulose ether and/or of the crosslinking additive is kept at a low value, the result is frequently not the formation of a gel but only an increase in the viscosity. The latter phenomenon is often useful in those cases in which the cellulose ether is intended to have only a thickening function, since it is then possible in these areas of application to employ amounts of cellulose ether which are low compared with unmodified cellulose ether types.

In particular the following abbreviations and parameters are customary in the nomenclature and characterization of cellulose ethers and will also be used in the text below: C=Cellulose, Alk=Alkyl, M=Methyl, E=Ethyl, HAlk=Hydroxyalkyl, HE=Hydroxyethyl, HP=Hydroxypropyl, HB=Hydroxybutyl, CAlk-=Carboxyalkyl, CM=Carboxymethyl, NaCM-=Sodium (Na) carboxymethyl, CE=Carboxyethyl, SAlk=Sulfonoalkyl, SE=Sulfonoethyl, PAlk=Phosphonoalkyl, PM=Phosphonomethyl, PP=3-Phosponopropyl, (MPM)=Methylphosphino-methyl, (MPP)=3-Methylphosphino-propyl, NaCMHE=-Sodium (Na) carboxymethylhydroxyethyl, MPM=Methyl-phosphonomethyl; DS=degree of substitution, that is to say the average number of substituted OH groups per anhydro-D—glucose unit—for cellulose it is within the range of 0.0 to 3.0; MS=molar degree of substitution, that is to say the average number of moles of the substituting reagent which are bonded ether-like per mole of anhydro-D—glucose unit—for cellulose it can also be greater than 3.0 and is normally used instead of DS to characterize those substituents on a cellulose ether which can be the result of a multiple substitution at an OH group (in the case of hydroxyalkyl groups); $DS_{PM}$=degree of substitution of a cellulose ether in respect of phosphonomethyl substituents; $MS_{HE}$=molar degree of substitution of a cellulose ether in respect of hydroxyethyl substituents.

Cellulose ethers which can be influenced in the direction of a strong viscosity increase or can be gelled by additives and which include in particular those which have anionic substituents, such as carboxymethyl groups, in the molecule are frequently used in the secondary production of petroleum. Secondary production is here understood as meaning the procedures in the recovery of petroleum which are started after the primary production, which is caused by natural or additionally aided natural forces (such as pressure due to natural gas or breaking up of underground formations). Secondary recovery procedures are becoming increasingly more interesting and important for economic and ecological reasons owing to increasing revenues from crude oil. This secondary production of crude oil from underground formations is caused, for example, by liquids which are introduced into the formation via additional wells (injections) in order to displace the petroleum from the formation toward the actual production well. For example, a water-soluble hydrocolloid, such as natural polymeric products (for example xanthane resin), a cellulose ether or an acrylic polymer, can be added to these liquids in order to increase their viscosity and hence to be able to displace the petroleum in an improved and more effective manner. In order to be employed for this purpose, hydrocolloids have to meet the following conditions, among others: They should increase the viscosities of the aqueous liquids to a very considerable extent, even when low quantities of hydrocolloid are added, or produce a stable mobile gel. They should also be soluble in salt solutions and ideally not coagulate in them and hence become ineffective, since underground formations frequently contain soluble salts or the liquids to be injected are already salt-containing. Also, the present or "in situ" produced viscosity, or, respectively, the gel produced should be stable over relatively long time periods at up to relatively high temperatures and at high shear values; that is to say under conditions as encountered in underground formations.

In the text which follows, terms from the field of colloid chemistry are used as they are defined in Roempps Chemie-Lexikon (Dictionary of Chemistry), Franckh'sche Verlagsbuchhandlung—Stuttgart, 7th Edition, 1976, entries "Gele (gels)" and "Kolloidchemie (colloid chemistry)," page 1244 and pages 1821 to 1827. A gel is in particular understood as meaning a state in which there are molecules of a liquid (normally water molecules) arranged among the solid, colloidally divided cellulose ethers. Other names for this state are lyogel (hydrogel) or jelly. It is known that the stability of such gels is a function of, inter alia, the pH value of the system or the presence of foreign ions.

The state of the art concerning the preparation of stable cellulose ether gels and/or their application has been disclosed, for example, in the printed publications which follow:

Ullmanns Encyklopädie der technischen Chemie (Ullmann's Encyclopedia of Industrial Chemistry), Verlag Chemie—Weinheim, 4th Edition—1975, Volume 9, entry "Celluloseaether (cellulose ethers)," pages 192 et seq. states (page 196) that salts have a considerable influence on the gel point of cellulose ether solutions. Multivalent cations, such as $Al^{3+}$ ions or $Cu^{2+}$ ions, are said to be particularly able to effect up to quantitative precipitation of NaCMC from their aqueous solutions (pages 197 and 211). Solutions of typical water-soluble cellulose ethers are in general non-Newtonian, that is to say their viscosity depends on the shear force or the shear rate (page 199), the result of which is that, in particular in the case of high viscosity cellulose ether types, differing viscosity values are produced as a function of the method of measurement. Only in the case of very low viscosity cellulose ether types is Newtonian flow also found.

German Auslegeschrift, No. 1,147,751 discloses a process for the preparation of gels of those cellulose ethers which carry carboxymethyl groups as substituents, in which process aqueous solutions of these cellulose ethers are reacted with aluminum alcoholates of saturated aliphatic alcohols. Gel formation is said to be encouraged by weakly acid pH values (for example of 4 to 5). If the amount of aluminum alcoholate added to too low, merely an increase in the viscosity is said to occur, a quantity of 12% (relative to dry cellulose ether) being considered adequate for gel formation. The resulting gels are suitable for the preparation of films, compositions for dental impressions or of engobes. In the discussion on the state of the art, mention is also made of a reaction of cellulose ethers with $Cr^{3+}$ ions resulting in the formation of a gel. Cellulose ethers mentioned as suitable for the process are NaCMC, CMC and NaCMHEC.

Pure or mixed cellulose ethers having 2,3-dihydroxypropyl groups as substituents, in accordance with German Offenlegungsschrift No. 2,415,154 or German Offenlegungsschrift No. 2,415,155 (=U.S. Pat. No. 4,001,210), can be reacted with compounds which provide borate ions, such as boric acid, borates or readily hydrolyzable boric acid esters, to give highly viscous products or stable gels. The reaction with borate ions is carried out either in an alkaline reaction medium or by the addition of borates to aqueous solutions of the cellulose ethers.

In a process for the preparation of a thickened, aqueous salt solution according to German Offenlegungsschrift No. 2,639,620 (=U.S. Pat. No. 4,035,195) CMHEC types having a $DS_{CM}$ of 0.2 to 0.6 and having an $MS_{HE}$ of 1.5 to 3.0 are crosslinked in an aqueous solution with multivalent metal cations. The concentration of cellulose mixed ether in the solution is 0.025 to 1%, and the molar ratio of the metal ions to carboxyl groups of the cellulose ether is 0.02 to 1. Suitable metal cations are said to be $Fe^{3+}$, $Al^{3+}$, $Cr^{3+}$ and $Zr^{4+}$, with cellulose ethers cross-linked with these being able to yield high viscosity solutions and also stable gels. The secondary production of petroleum is mentioned as a field of application, whereby salt solutions present underground have to be thickened.

German Offenlegungsschrift No. 2,928,247 (=U.S. Pat. No. 4,183,765) describes a process for increasing the viscosity of an aqueous HAlkC solution, in which process the aqueous solution contains at least 0.075% by weight of the cellulose ether, and 0.4 to 75% (relative to the weight of the cellulose ether) of benzoquinone are added to this solution, and this solution then has a pH value of over 6.4. It is said to be possible to influence the viscosity not only of HEC or HPC but also of their mixed ethers (for example HECMC).

The preparation of shaped products (fibers, tapes or films) based on alkali-, water- and acid-insoluble CAlkC is known from U.S. Pat. No. 2,420,949, and although in principle the free acid form of the cellulose ethers is present, at least some of the carboxyl groups are cross-linked by $Zr^{4+}$ ions or $ZrO^{2+}$ ions and the content of Zr ions (calculated as $ZrO_2$) in the crosslinked cellulose ether is 3 to 9%.

Pure or mixed cellulose ethers containing at least 1.4 dihydroxypropyl groups per anhydro-D-glucose unit in accordance with U.S. Pat. No. 4,096,326, are water-soluble and thermoplastic and can be treated with 0.05 to 10 parts by weight of borate ions or antimonate ions per part by weight of cellulose ether in solution. The resulting cellulose ether borate or cellulose ether antimonate complexes have, in aqueous solution, a considerably increased viscosity compared to untreated cellulose ethers, which viscosity persists also in salt solutions or is even higher therein. Products thus modified are intended to be used, for example, in the secondary production of petroleum.

In a process for the gel-forming setting of drilling muds, described in German Pat. No. 2,109,823, aqueous solutions of metal salts of multivalent cations, such as $Al^{3+}$, $Fe^{3+}$, $Cr^{3+}$, of $Cu^{2+}$, which salts have an acid reaction, are added "in situ" to systems containing CMC (as a prototype of a polymer which contains carboxymethyl groups). Drilling mud solutions themselves are in general rendered neutral or slightly alkaline and contain 0.2 to 4% by weight of the polymer which contains carboxymethyl groups. Quantity ratios indicated in the examples for the salt added are 0.03 to 0.2 parts by weight of salt per part by weight of cellulose ether.

German Offenlegungsschrift No. 2,544,777 (=British Pat. No. 1,503,897) describes a fragrance carrier based on CMC gels crosslinked with at least trivalent metal ions. The gels contain 0.5 to 10% by weight of CMC and 0.2 to 5% by weight of metal salts having $Al^{3+}$, $Fe^{3+}$ or $Cr^{3+}$ ions.

European Published Application No. 0,007,012 and European Published Application No. 0,007,013 disclose gelling compositions for the secondary production of petroleum which contain, in addition to water and 0.1 to 3.0% of a thickener, such as a cellulose ether (for example CMC, CEC, CMHEC, HEC, HPC, MHPC, MC, EC, PC, ECMC, MEC or HPMC), also about 0.001 to about 1% of an aldehyde and/or of a phenolic component. These gelling compositions may also contain, if appropriate, additionally 0.4 to 35% of an acid.

The process for consolidation of wells which is described in U.S. Pat. No. 2,439,833 is carried out either by introducing an aqueous NaCMC solution having an adequate quantity of certain salts into the porous underground formations of a well or by additionally introducing an aqueous solution of these salts, namely, $FeSO_4$, $FeCl_3$, $Ba(NO_3)_2$, $SnCl_2$, $Pb(CH_3COO)_2$, or $Al_2(SO_4)_3$ into the well, in order to effect the consolidation (for example by means of gel formation). This consolidation can be reversed by the addition of water-soluble hydroxides, such as NaOH.

According to U.S. Pat. No. 3,804,174, a consolidation medium for wells can contain, in addition to cement and water, a reaction product formed from a water-soluble cellulose ether and a multivalent metal ion. Cellulose ethers include HEC, CMC and CMHEC and the metal ions include $Zr^{4+}$, $Pb^{2+}$, $Cr^{3+}$, $Fe^{3+}$, $Hf^{4+}$, $La^{3+}$ and $Y^{3+}$, and in particular $ZrO^{2+}$.

In U.S. Pat. No. 3,971,440, the disclosed process for improving the secondary production of oil by means of aqueous gels also employs a polyacrylamide in addition to water, a cellulose ether, a reducible metal ion and a reducing agent for the metal ion.

U.S. Pat. No. 4,018,286 describes a process for the preparation of a temporary consolidation of an underground formation, in which process a composition of (a) a gellable polymer, such as a cellulose ether or an acrylic polymer and (b) a complex formed from an $Fe^{2+}$ cation, $Fe^{3+}$ cation, $Al^{3+}$ cation, $Ti^{4+}$ cation, $Sn^{2+}$ cation, $Ca^{2+}$ cation, $Mg^{2+}$ cation or $Cr^{3+}$ cation and an anion which is suitable for complexing the cation, such as a tartrate ion or a citrate ion, is maintained at a pH value of 3 to 7 for as long as the consolidation is intended to last, and in which process a reversal of the consolidation is effected by lowering or increasing this pH value.

The process in accordance with U.S. Pat. No. 4,096,074 for the secondary production of petroleum comprises also the addition of an aqueous solution having a thickening action, comprised of a reaction product formed from an organic polyisocyanate and a linear, nonionic polysaccharide ether (for example HEC, HPC, MHPC or HEHPC), the polyisocyanate acting as a crosslinking agent for the polysaccharide ether.

These very numerous publications show that there is obviously no universally applicable means which can be used in all the very diverse fields of application of aqueous gels.

Frequently the gels described are stable only within certain pH ranges and reliquefy on changes in the pH value. In some cases complex compositions and/or expensive organic additives are required to produce a gel. To make possible economical and problem-free application, in particular in the field of the secondary production of petroleum which employs very large quantities, the gel components must be inexpensive and simple to handle. Possible active components have up to now been essentially the polysaccharide derivatives CMC (NaCMC) or CMHEC which contain carboxymethyl groups and inexpensive inorganic salts of multivalent cations, such as $Al^{3+}$ and $Cr^{3+}$. However, these cellulose ethers form stable gels only within the neutral range, while no gelling effect is achieved with multivalent cations in the alkaline or strongly acid range. Instead, cloudings and precipitations of the cellulose ether occur.

SUMMARY OF THE INVENTION

It is therefore an object of the present invention to provide a composition which can form aqueous gels which satisfy the very widely varying practical requirements and, in particular, are stable in very widely varying pH value ranges.

It is also an object of the present invention to provide a process for the preparation of a gel from the gel-forming compositions according to the invention.

Finally, it is also an object of the invention to provide an improved process for the secondary production or recovery of petroleum, using the compositions of the invention.

In accomplishing the foregoing objects, there has been provided in accordance with one aspect of the present invention a gel-forming composition, comprising: (a) water, (b) a water-soluble cellulose mixed ether having at least one nonionic substituent comprising hydroxyalkyl or alkyl and at least one ionic substituent, including at least one phosphorus containing substituent comprising a phosphonoalkyl group or a P-alkylphosphinoalkyl group as one of the ionic substituents. Preferably, the degree of substitution DS of the cellulose ether, relative to the phosphorus-containing substituent, is within the range from about 0.01 to 0.4 and the degree of substitution, relative to the non-ionic substituent, of the $DS_{Alk}$ or the $MS_{HAlk'}$ is at least about 1.3. Most preferably, the cellulose mixed ether further comprises an ionic substituent comprising a carboxyalkyl group and/or a sulfonoalkyl group having a DS of at most about 0.3, and the salt contains a divalent, trivalent, or tetravalent cation comprising $Zr^{4+}$, $ZrO^{2+}$, $Ti^{4+}$, $TiO^{2+}$, $Fe^{3+}$, $Al^{3+}$, $Cr^{3+}$, $Pb^{2+}$, or $Ca^{2+}$.

In another aspect of the invention, there has been provided a process for the preparation of a gel from the composition as defined above, which comprises the steps of forming an aqueous solution of the water-soluble cellulose mixed ether and the salt; and adjusting the pH of the solution to the value required for gel formation. Optionally, the process further comprises the step of adding a buffering salt before gel-formation.

According to still another aspect of the invention, there has been provided a process for the reversible reversal of a gel prepared as described above, which comprises the steps of adding to the gel an amount, which stoichiometrically is at least equal to the gel's content of multivalent cation, of an agent which complexes the cation at the preselected pH value of the gel while producing at most only a small effect on the pH value. In one embodiment, this comprises adding an amount of fluoride ions in the form of an aqueous solution of an alkali metal fluoride to the gel, wherein the gel contains $Al^{3+}$ ions, $Fe^{3+}$ ions, $Zr^{4+}$ ions or $ZrO^{2+}$ ions as the multi-valent cation.

Finally, there has been provided in accordance with still another aspect of the invention a process for the secondary production of petroleum, comprising the steps of injecting into an underground formation a gel-forming composition as defined above and causing the composition to gel while in said formation.

Further objects, features and advantages of the present invention will become apparent from the detailed description of preferred embodiments which follows.

DETAILED DESCRIPTION OF PREFERRED EMBODIMENTS

The invention is based on a gel-forming composition which is based on (a) water, (b) a water-soluble mixed cellulose ether having at least one nonionic substituent from the group comprising hydroxyalkyl and alkyl and at least one anionic substituent, and (c) a salt containing a cation which is at least divalent. In the gel-forming composition according to the invention the water-soluble cellulose mixed ether has a phosphonoalkyl group or a P-alkylphosphinoalkyl group as ionic substituents or as at least one of the ionic substituents.

Water-soluble phosphorus-containing mixed cellulose ethers were first disclosed in German patent application No. P 30 39 963.4 filed on Oct. 23, 1980 and having the title "Water-soluble cellulose mixed ethers which contain a phosphonomethyl substituent and process for preparing same" and in German patent application No. P 31 12 945.5 filed on Mar. 31, 1981, the latter being filed in the United States simultaneously with this application and having the title "Cellulose ethers and cellulose mixed ethers having at least one phosphorus-containing substituent and process for their manufacture."

The first of the two patent applications relates to water-soluble cellulose mixed ethers having (a) at least one substituent from the group comprising alkyl, hydroxyalkyl, carboxyalkyl, sulfonoalkyl and dialkylaminoalkyl and (b) a phosphonomethyl substituent having a DS of the first substituent(s) different from hydroxyalkyl, of 0.05 to 2.95 and/or of an $MS_{HAlk}$ of 0.5 to 6.0 and of a $DS_{PM}$ of 0.005 to 0.8. These cellulose mixed ethers include in particular those which have (a) a hydroxyethyl substituent having an $MS_{HE}$ of 0.8 to 5.0 and (b) a $DS_{PM}$ of 0.01 to 0.6. These cellulose mixed ethers can be prepared by reacting, per mole of cellulose, 0.1 to 25 moles of the etherification agent(s) for producing the substituents under (a), 0.05 to 2.0 moles of halogen methanephosphonate ions as etherification agents for producing the substituent under (b) and 0.8 to 12.0 moles of hydroxide ions. During this reaction, depending on the type of etherification agent for producing the substituent under (a), there is present up to 30 parts by weight, per part by weight of cellulose, of a mixture of an inert organic solvent, which preferably is miscible with $H_2O$, and of $H_2O$ which mixture has a water content of 3 to 40% by weight. Possible etherification agents are, inter alia, ethylene oxide or chloromethanephosphonic acid or the corresponding salt forms, and isopropanol is preferably used as the organic solvent.

The second of the two patent applications mentioned relates to those cellulose ethers which have at least one phosphorus-containing substituent or to their mixed ethers also including at least one phosphorus-free substituent from the group comprising alkyl, hydroxyalkyl, carboxyalkyl, sulfonoalkyl, aminoalkyl and dialkylaminoalkyl. The phosphorous containing substituent(s) carry groups described by the general formula

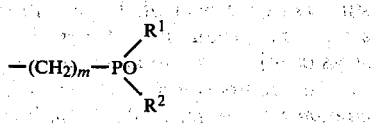

in which $R^1$ and $R^2$ are OX; or $R^1$ is OX and $R^2$ is OY; or $R^1$ is OX and $R^2$ is $(CH_2)_n—CH_3$; or $R^1$ and $R^2$ are $(CH_2)_n—CH_3$; or $R^1$ is $(CH_2)_n—CH_3$ and $R^2$ is $(CH_2)_p—CH_3$; whereby X and Y are identical or different and denote a hydrogen atom or a monovalent cation, m denotes an integer from 1 to 4, and n and p are identical or different and denote 0 or 1. However, those groups are excluded in which m is 1 or 2 and $R^1$ and $R^2$ are OX; or $R^1$ is OX and $R^2$ is OY, m thereby being 1 or 2. These new materials then are derivatives of alkanephosphonic acids, alkyl alkylphosphinic acids and alkyl dialkylphosphane oxides. These cellulose ethers can be prepared by reacting from about 0.8 to 15 moles of hydroxide ions, 0.05 to 3 moles of halogenoalkanephosphonate ions, halogenoalkyl alkylphosphinate ions or halogenoalkyldialkylphosphane oxide and, if mixed ethers are to be prepared, from about 0.1 to 25 moles of etherification agent(s) for producing the phosphorus-free substituent(s), per mole of cellulose. At least about 5 moles of water are present in the reaction medium.

Of the phosphorus-containing mixed cellulose ethers, those are preferably employed in which the DS, relative to the phosphorus-containing substituent, is within the range from about 0.01 to 0.4, in particular 0.02 to 0.2, and very particularly from about 0.04 to 0.15, and the degree of substitution ($DS_{Alk}$ or $MS_{HAlk}$), relative to the nonionic substituent, is at least about 1.3, such a degree of substitution of the nonionic substituent characterizing approximately the transition from a water-insoluble state to a water-soluble state of a cellulose ether which carries exclusively this nonionic substituent. The phosphorus-containing substituents of these compounds are appropriately described by the general formula (I) in the case of the phosphonoalkyl group and by the general formula (II) in the case of the P-alkylphosphinoalkyl group:

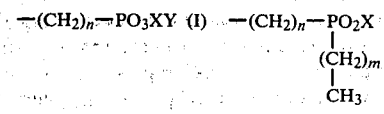

in which n is an integer from 1 to 4, preferably 1 or 3; m is 0 or 1, preferably 0; and X and/or Y denote hydrogen or a monovalent cation, preferably $Na^+$ or $NH_4^+$. In the nonionic substituent(s), the hydroxyalkyl group has 2 to 4, preferably 2, C atoms and the alkyl group has 1 or 2, preferably 1, C atom(s). In addition to at least one phosphorus containing substituent, the water-soluble cellulose ethers can also carry, as a further ionic substituent, a carboxyalkyl group and/or a sulfonoalkyl group having a DS of at most 0.3, of which a carboxymethyl group or a sodium carboxymethyl group or a sulfonoethyl group is preferred. Examples of suitable cellulose ethers are thus: MPMC, EPMC, HEPMC, HE(MPM)C, HPPMC, HECMPMC and HESEPMC.

In particular, those salts which contain a cation from the group comprising $Zr^{4+}$, $ZrO^{2+}$, $Ti^{4+}$, $TiO^{2+}$, $Fe^{3+}$, $Al^{3+}$, $Cr^{3+}$, $Pb^{2+}$ and $Ca^{2+}$ are possible for use as component (c), that is to say the salt containing a cation which is at least divalent. Possible anions for these cations are advantageously those which make the corresponding salt soluble in water. They include (still dependent on the type of cation) in particular chlorides, sulfates and nitrates, but also acetates, sulfites, nitrites and hydrogen carbonates. The quantity proportions of the components in the gel-forming composition according to the invention are preferably chosen so that the aqueous system contains from about 0.03 to 10% by weight, in particular from about 0.2 to 5% by weight, of component (b), that is to say of the water-soluble cellulose mixed ether, and, relative to 1 mole of the phosphorus-containing substituent of the cellulose mixed ether, from about 0.2 to 20 moles, in particular from about 0.5 to 5 moles, and very particulary, from about 1 to 3 moles, of the cation of component (c).

In carrying out a process for the preparation of a stable gel from the gel-forming composition according to the invention, either the salt is added in a solid form or in the form of an aqueous solution to an aqueous solution of the cellulose mixed ether, or the two solid components are premixed in the dry state and then dissolved in water, thereafter, finally, the pH value of the system required for gel formation is set by artificial means or is predetermined by the circumstances in the area of application (for example, an underground formation in the secondary production of oil). To establish the optimum pH value, a buffer salt, such as sodium acetate, can be added in a solid form or in the form of an aqueous solution at almost any stage of the process. For the gelling action of individual cations of component (c) on the phosphorus-containing mixed cellulose ethers of component (b), the following pH value ranges are in general possible: $Zr^{4+}(ZrO^{2+})$ for $pH \leq 4$, $Ti^{4+}$ ($TiO^{2+}$) for pH=4 to 6, $Fe^{3+}$ or $Al^{3+}$ for pH=5 to 8, $Cr^{3+}$ for pH=7 to 9, $Pb^{2+}$ for pH=8 to 11 and $Ca^{2+}$ for pH=10 to 13. Since the transition between a solution and a gel can be fluid and cannot be defined completely unambiguously, the invention is intended to include solutions which are considerably thickened, due to salt crosslinking. That is to say, the expression "gel-forming" is intended to mean that considerably thickened or preferably gelled systems can result from the components of the gel-forming composition according to the invention.

It is surprising that a remarkably low degree of substitution with phosphorus, for example a $DS_{PM}$ of 0.02 in an HEPMC having an $MS_{HE}$ of 2.4, is already sufficient to produce stable gels in a neutral medium, for example, by means of $Al^{3+}$ ions or $Fe^{3+}$ ions. It is particularly surprising that, although the solution of such a cellulose mixed ether on acidification up to pH values of 0 or below is no longer gelled by means of, for example, $Al^{3+}$ ions, the addition of zirconium salts, such as $ZrOCl_2$, again produces clear and stable gels which only reliquefy on heating. In contrast to HEPMC gels containing $Al^{3+}$ ions in a neutral medium, where cooling of a heat-liquified gel reproduces a stable gel in a reversible manner, in the case of acidic, heat-liquified HEPMC gels containing $Zr^{4+}$ ions, no reversible gelling occurs on cooling, since it is probable that an accelerated acid hydrolysis of the cellulose mixed ether resulting in substantial chain degradation takes place under the thermal stress. In an alkaline medium, gellings can likewise be obtained, if, for example, $Ca^{2+}$ (in the form of $CaCl_2$) is chosen as a crosslinking cation and the system is as free as possible of carbonate ions. In particular, it can then contain $NH_3$ to prevent substantial precipitations of $CA(OH)_2$.

The tendency of phosphorus-containing cellulose mixed ethers present in a gel-forming composition according to the invention to form gels by ionogenic crosslinking reactions with cations which are at least divalent depends substantially on the degree of substitution of the ether group, on the type of the crosslinking cation, on the concentration of the components, on the average chain length (molecular weight) of the cellulose mixed ether, on the pH value, on the temperature and on the content in the system of foreign electrolytes, which must not interact at all or only to a minor extend (or example in precipitation or complexing reactions) with the crosslinking cation and/or the ionic groups in the cellulose mixed ether. For example, it can be assumed that, at concentrations of the cellulose mixed ether in an aqueous system from about 0.5% by weight upward, crosslinking with the metal ion, at a molar ratio of metal ion to phosphorus-containing substituent of at least 1, generally effects gel formation. At lower concentrations of cellulose mixed ether and/or lower molar ratios of metal ion: P-containing substituent, it is also possible that merely a significant viscosity increase and-/or thixotropic behavior of the aqueous sytem occurs. Exact limits cannot be given for the above-mentioned reasons (many parameter influences). If an aqueous solution containing increased amounts of salts is used for dissolving the cellulose mixed ether, instead of demineralized or naturally occurring water, a synergistic effect can also arise, which effect can additionally strongly increase the gelling tendency. In the case of, for example, HEPMC/$Al^{3+}$ mixtures, this effect can be observed in particular when using NaCl and to a small extent also on using K salts.

The composition according to the invention is suitable for the preparation of strongly thickened or, in particular, gelled aqueous systems, which are preferentially used to an increasing extent in the petroleum production industry in the secondary production of petroleum. Only small amounts of water-soluble polymer are required if the composition according to the invention is used. The composition according to the invention is superior, for example, to previously known HECMC systems, since stable gellings already occur even at very low degrees of substitutions of ionic substituents, and operating at strongly acid pH values is possible when zirconium salts are used as a crosslinking reagent.

In addition, a method has been found by means of which the resulting gels can be liquefied and freshly regenerated several times in a reversible manner without temperature value or pH value alteration. In this process for the reversible reversal of a gel (prepared as described above), an amount, which stoichiometrically is at least identical to the gel's content of crosslinking, multivalent cation, of an agent which complexes the cation without or with only a small effect on the pH value at the given pH value, in particular an amount, which is more than stoichiometric compared with the content of $Al^{3+}$ ions, $Fe^{3+}$ ions, $Zr^{4+}$ ions or $ZrO^{2+}$ ions, of fluoride ions in the form of an aqueous solution of an alkali metal fluoride of ammonium fluoride, is added to the gel. It can be assumed that the multivalent metal cation is bonded in the resulting, for example, hexafluoro complexes, whereby the metal cation's crosslinking function in the mixed cellulose ether is diminished or completely reversed (gel liquefaction). In this process there are no substantial pH value changes which otherwise frequently occur and some of which are accompanied by precipitations of sparingly soluble metal salts. Such precipitations frequently cause trouble in practice. If a renewed regeneration of a stable gel is desired, a stoichiometric excess of the corresponding multivalent metal ions can again be added in salt form to the aqueous system to effect a renewed crosslinking. This process of reversing and regenerating the gel can be repeated a number of times.

Cellulose mixed ethers containing phosphonoalkyl groups or P-alkylphosphinoalkyl groups together with cations which are at least divalent, thus provide new thickening or gelling aqueous systems, the properties of which can be used under the most diverse conditions.

In the Examples which follow, % data are to be understood as meaning % by weight, and parts by weight are related to parts by volume as g is related to $cm^3$. The indicated viscosities were determined at 20° C. by means of a Hoeppler falling ball viscometer in an aqueous solution having the concentrations which are indicated in each case.

EXAMPLE 1

The Example demonstrates the effect which different multivalent metal cations have on the viscosity of a diluted solution of HEPMC within the neutral range. 4.5 parts by weight of an HEPMC having an $MS_{HE}$ of 2.48 and a $DS_{PM}$ of 0.02 are dissolved in a quantity of water such that a solution of 810 parts by weight is obtained. 1 part by weight of an aqueous metal salt solution containing 0.047 mmole of the corresponding cation per g of solution is added to portions of this solution of 90 parts by weight in each case, the pH value is adjusted to 6.0 by means of solid Na acetate and water is added to give 100 parts by weight. 0.5% strength solutions of the cellulose mixed ether result which contain 0.037 mmole of phosphonic acid groups per 100 g of solution. The molar ratio in the aqueous solution of multivalent metal cation to phosphorus-containing substituent is 1.3.

TABLE I

| Metal Salt | Multivalent Cation | Viscosity (mPas) |
|---|---|---|
| — | — | 10 |
| $AlCl_3.6\ H_2O$ | $Al^{3+}$ | 28 |
| $CaCl_2.2\ H_2O$ | $Ca^{2+}$ | 10 |
| $Cr_2(SO_4)_3.18\ H_2O$ | $Cr^{3+}$ | 11 |
| $CuSO_4.5\ H_2O$ | $Cu^{2+}$ | 10 |
| $FeCl_3.6\ H_2O$ | $Fe^{3+}$ | 33 |
| $Pb(NO_3)_2$ | $Pb^{2+}$ | 11 |
| $ZrOCl_2.8\ H_2O$ | $Zr^{4+}\ (ZrO^{2+})$ | 12 |

It is clear that $Al^{3+}$ ions and $Fe^{3+}$ ions have the strongest crosslinking and hence the strongest viscosity-increasing action within the neutral range.

EXAMPLE 2

The Example demonstrates the pH-dependence of a viscosity-increasing crosslinking reaction of HEPMC with $Al^{3+}$ ions in aqueous solution. 13.2 parts by weight of an HEPMC in accordance with the instructions of Example 1 are dissolved in water to give 850 parts by weight of the solution. 2 parts by weight of a 3% strength aqueous solution of $KAl(SO_4)_2.12\ H_2O$ are added per 90 parts by weight in each case of this solution. Various amounts (0.1 to 1.0 part by volume) of dilute aqueous $NH_3$ solution or 0.1 part by volume of a 2 N aqueous NaOH solution are then added, and the mixture is made up to 100 parts by weight with water. Solutions are produced which are 1.4% strength with respect to HEPMC and 0.06% strength with respect to salt and have various pH values within the range 4.5 to 9.5. The molar ratio of $Al^{3+}$ to phosphorus-containing substituents in the solutions is in all cases 1.2.

TABLE II

| pH Value of the aqueous solution | Viscosity (mPas) |
|---|---|
| 4.5 | 420 |
| 5.2 | 470 |
| 5.9 | 2,300 |
| 6.5 | 22,000 |
| 7.1 | 48,000 |
| 7.9 | 35,000 |
| 8.7 | 2,200 |
| 9.5 | 370 |

It is observed that the crosslinking and viscosity-increasing action within the neutral range has a maximum at a pH value of about 7 and is virtually non-existent at pH <5 and >9.

EXAMPLE 3

The Example demonstrates the influence of foreign electrolytes in an aqueous HEPMC solution on the viscosity-increasing crosslinking effect with $Al^{3+}$ ions. An HEPMC in accordance with the instructions of Example 1 is dissolved in various salt solutions in a concentration of 0.5%, relative to the corresponding salt solution, and the pH value is adjusted to 6.3. After the addition of 0.021 part by weight of $KAl(SO_4)_2.12\ H_2O$ to each 100 parts by weight of the solutions (corresponding to a molar ratio of $Al^{3+}$ to phosphorus-containing substituents of 1.3 in the solution) the viscosities are measured.

TABLE III

| Foreign electrol. | Concentration (%) of foreign electrolyte | Viscosity m(Pas) |
|---|---|---|
| — | — | 28 |
| KCl | 7.0 | 30 |
| $KNO_3$ | 7.0 | 38 |
| $KNO_3$ | 12.0 | 28 |
| $Na_2SO_4$ | 2.8 | 35 |
| $Na_2SO_4$ | 7.0 | 31 |
| $MgSO_4$ | 1.8 | 27 |
| NaCl | 1.0 | 32 |
| NaCl | 2.0 | 44 |
| NaCl | 4.0 | 52 |
| NaCl | 7.0 | 64 |
| NaCl | 10.0 | 69 |
| NaCl | 16.0 | 77 |

It is obvious that particularly NaCl strongly aids the viscosity-increasing effect of the $Al^{3+}$-crosslinking of HEPMC, while the other salts listed only have weak or no effects.

EXAMPLE 4

The Example demonstrates the crosslinking action of various metal cations on solutions of HEPMC at various pH values. Small amounts of salts of multivalent cations (as 0.1 M solutions) are added to 50 parts by weight of a 1% strength aqueous solution, in pure water, of an HEPMC having an $MS_{HE}$ of 1.92 and a $DS_{PM}$ of 0.02, which solution shows neither thixotropy phenomena nor jelly-type structures. The pH value is then adjusted by means of a few drops of concentrated or dilute acids or bases (HCl, acetic acid, aqueous $NH_3$ solution or aqueous NaOH solution) until the maximum gel (jelly) structure appears. The starting solution contains 2.0 mmoles of HEPMC, corresponding to 0.04 mmole of phosphonomethyl groups, per 50 g of solution. Table IV lists the salts by type and amount, the pH values and the crosslinking effects.

TABLE IV

| Salt having a multivalent cation | | mmole of cation per mmole of P group | pH Value | Structure of aqueous System |
|---|---|---|---|---|
| Type | Cation | | | |
| $KAl(SO_4)_2$ | $Al^{3+}$ | 1.25 | 7.0 | stable gel |
| $KAl(SO_4)_2$ | $Al^{3+}$ | 1.25 | 4.0 | like starting solution |
| $Fe_2(SO_4)_3$ | $Fe^{3+}$ | 1.00 | 6.5 | thixotropic solution |
| $Fe_2(SO_4)_3$ | $Fe^{3+}$ | 3.00 | 7.0 | stable gel |
| $Cr_2(SO_4)_3$ | $Cr^{3+}$ | 3.75 | 6.0 | slight gel struct. |
| $Cr_2(SO_4)_3$ | $Cr^{3+}$ | 3.75 | 8.5 | stable gel |
| $TiOSO_4$ | $TiO^{2+}$ | 3.75 | 4.5 | stable gel |
| $TiOSO_4$ | $TiO^{2+}$ | 3.75 | 1.5 | like starting solution |
| $ZrOCl_2$ | $ZrO^{2+}$ | 0.75 | 6.0 | like starting solution |
| $ZrOCl_2$ | $ZrO^{2+}$ | 0.75 | 4.0 | slightly thixotropic solution |
| $ZrOCl_2$ | $ZrO^{2+}$ | 2.50 | 4.0 | stable gel |
| $ZrOCl_2$ | $ZrO^{2+}$ | 2.50 | 1.0 | stable gel |
| $Pb(NO_3)_2$ | $Pb^{2+}$ | 1.25 | 6.5 | like starting solution |
| $Pb(NO_3)_2$ | $Pb^{2+}$ | 1.25 | 9.0 | stable gel |
| $Pb(NO_3)_2$ | $Pb^{2+}$ | 1.25 | 12.5 | like starting solution |
| $CaCl_2$ | $Ca^{2+}$ | 2.50 | 6.5 | like starting solution |
| $CaCl_2$ | $Ca^{2+}$ | 2.50 | 11.5 | stable gel |

It is observed that 3-valent cations, such as $Cr^{3+}$, $Fe^{3+}$ and $Al^{3+}$, have the strongest crosslinking action within the neutral range, while salts of 4-valent cations, such as $TiOSO_4$ and $ZrOCl_2$, display their crosslinking action in an acid medium and 2-valent cations, such as $Ca^{2+}$ and $Pb^{2+}$, in a basic medium.

Given a 1% solution of HEPMC in a strong acid, such as a 15% strength aqueous HCl solution, it is likewise possible to obtain a stable gel (pH value = −0.6) in the manner indicated by the addition of $ZrOCl_2$ (as a solid or as a solution).

EXAMPLE 5

The Example demonstrates the gelling tendencies of various phosphorus-containing anionic cellulose mixed ethers with $Al^{3+}$ ions in a neutral medium. 50 parts by weight of 2% strength aqueous solutions of various cellulose ethers, which solutions showed neither thixotropic nor jelly-type phenomena, are treated with a solid mixture of $KAl(SO_4)_2.12\ H_2O$ and Na acetate in a weight ratio of 1:1. This results in solutions have pH values of 6.5 and being modified in their rheology. The degrees of substitution of the cellulose mixed ethers, the type of the ether substituents, the necessary $Al^{3+}$ ion additions and also the outward appearance of the aqueous systems are listed in Table V.

It is observed that $Al^{3+}$ ions cause crosslinking phenomena in all cases, with only thixotropic solutions being obtained in the case of a very low degree of P substitution (DS 0.01), even with a large $Al^{3+}$ excess.

EXAMPLE 6

The Example illustrates the preparation and use of an HEPMC-containing mixture which, on dissolving, forms a stable gel without any subsequent additions. 9.0 parts by weight of an HEPMC (with a $DS_{PM}$ of 0.11 and an $MS_{HE}$ of 1.90, viscosity at a 2% concentration being 15 mPas) are mixed intimately in a powder mill together with 1.8 parts by weight of $KAl(SO_4)_2.12\ H_2O$ and 1.5 parts by weight of anhydrous Na acetate. Stirring 1.5 parts by weight of the mixture into 50 parts by weight of tap water results in a clear gel which contains 2.1% of HEPMC and has a pH value of 6.0.

EXAMPLE 7

The Example demonstrates the repeatable gel formation and gel reversal by means of aluminum salts or zirconium salts on subsequent complexing of the metal cation by addition of fluoride.

(a) 0.5 part by weight of a mixture of $KAl(SO_4)_2.12\ H_2O$ and Na acetate in a weight ratio of 3:2 is added to 100 parts by weight of a 1% strength aqueous solution of HEPMC ($MS_{HE}$ of 1.64 and $DS_{PM}$ of 0.15), which shows neither thixotropy nor gel structure. This produces a clear stable gel. After the addition of 2.5 parts by volume of a 10% strength aqueous NaF solution, the gel structure disappears and the solution retains only a small degree of thixotropy. The fresh addition of 0.8 part by weight of the alum/acetate mixture regenerates a stable gel which is reliquefied by the addition of a further 3.5 parts by volume of the NaF solution. The resulting pH value changes due to the successive additions are low and vary in the range from 5.6 to 6.5. Gel formations and gel reversals take place in each case within 30 seconds after the corresponding additions have been made while stirring vigorously.

(b) 100 parts by weight of a solution as in (a) are adjusted by means of a concentrated aqueous HCl solution to a pH value of 1.1. Stirring in 0.4 part by weight of $ZrOCl_2.8\ H_2O$ produces a clear stable gel. 5 parts by volume of a NaF solution as in (a) are then added, with only a very slightly thixotropic solution resulting. After a fresh addition of 0.4 part by weight of $ZrOCl_2.8\ H_2O$ the gel is reformed, whereupon a further 6.6 parts by volume of NaF solution are added, again resulting in a slightly thixotropic solution. After a further addition of 3 parts by volume of NaF solution, thixotropy disappears completely.

What is claimed is:

1. A gel-forming composition, comprising: (a) water, (b) a water-soluble cellulose mixed ether having at least one nonionic substituent comprising hydroxyalkyl or alkyl and at least one anionic substituent, including at least one phosphorus-containing substituent comprising a phosphonoalkyl group or a P-alkylphosphinoalkyl group as one of the ionic substituents, and (c) a salt containing a cation which is at least divalent.

TABLE V

| Type of mixed ether | Phosphorus-containing substituent Formula | DS | Further substituent(s) Formula | DS or MS | Molar ratio(*) | Structure of the aqueous system |
|---|---|---|---|---|---|---|
| HEPMC | $-CH_2-PO_3HNa$ | 0.15 | $-CH_2-CH_2-OH$ | 1.64 | 1.1 | clear stable gel |
| HEPMC | $-CH_2-PO_3HNa$ | 0.075 | $-CH_2-CH_2-OH$ | 2.55 | 2.0 | clear stable gel |
| HEPPC | $-(CH_2)_3-PO_3HNa$ | 0.17 | $-CH_2-CH_2-OH$ | 2.03 | 1.4 | cloudy stable gel |
| HEPPC | $-(CH_2)_3-PO_3HNa$ | 0.06 | $-CH_2-CH_2-OH$ | 1.94 | 1.5 | clear stable gel |
| HPPMC | $-CH_2-PO_3HNa$ | 0.22 | $-CH_2-CH-OH$<br>$\quad\quad\ \ \mid$<br>$\quad\quad\ \ CH_3$ | 1.14 | 1.1 | slight gel structure |
| HE(MPP)C | $-(CH_2)_3-PO_2Na$<br>$\quad\quad\quad\ \ \mid$<br>$\quad\quad\quad\ \ CH_3$ | 0.14 | $-CH_2-CH_2-OH$ | 1.46 | 1.1 | clear very stiff gel |
| HE(MPM)C | $-CH_2-PO_2Na$<br>$\quad\quad\ \ \mid$<br>$\quad\quad\ \ CH_3$ | 0.01 | $-CH_2-CH_2-OH$<br>$-CH_2-CH_2-OH$ | 1.80<br>1.32 | 5.0 | thixotropic solution |
| HECMPMC | $-CH_2-PO_3HNa$ | 0.04 | $-CH_2-COONa$ | 0.20 | 1.5 | slightly cloudy stable gel |
| MHEPMC | $-CH_2-PO_3HNa$ | 0.01 | $-CH_3$<br>$-CH_2-CH_2-OH$ | 1.41<br>0.18 | 4.0 | thixotropic solution |

(*)$Al^{3+}$ to phosphorus-containing substituent in the solution

2. A composition as claimed in claim 1, wherein the degree of substitution DS of the cellulose ether, relative to the phosphorus-containing substituent, is within the range from about 0.01 to 0.4 and the degree of substitution, relative to the non-ionic substituent(s), of the $DS_{Alk}$ and/or the $MS_{HAlk}$, is at least about 1.3.

3. A composition as claimed in claim 1 or 2, wherein the cellulose mixed ether further comprises an ionic substituent comprising a carboxyalkyl group and/or a sulfonoalkyl group having a DS of at most about 0.3.

4. A composition as claimed in claim 1, wherein the salt contains a divalent, trivalent, or tetravalent cation comprising $Zr^{4+}$, $ZrO^{2+}$, $Ti^{4+}$, $TiO^{2+}$, $Fe^{3+}$, $Al^{3+}$, $Cr^{3+}$, $Pb^{2+}$ or $Ca^{2+}$.

5. A composition as claimed in claim 1, which contains from about 0.03 to 10% by weight of the cellulose mixed ether and, relative to 1 mole of the phosphorus-containing substituent of the cellulose mixed ether, from about 0.2 to 20 moles of a cation which is at least divalent.

6. A composition as claimed in claim 1, wherein the phosphonoalkyl group has the general formula (I) and the P-alkylphosphinoalkyl group has the general formula (II)

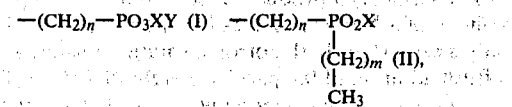

wherein
n is an integer from 1 to 4;
m is 0 or 1; and
X and/or Y denote hydrogen or a monovalent cation.

7. A composition as claimed in claim 6, wherein
n is 1 or 3;
m is 0; and
X and/or Y denote $Na^+$ or $NH_4^+$.

8. A composition as claimed in claim 1, wherein the hydroxyalkyl group in the nonionic substituent(s) has 2 to 4 C atoms and the alkyl group has 1 or 2 C atom(s).

9. A process for the preparation of a gel from the composition as claimed in claim 1, which process comprises the steps of forming an aqueous solution of the water-soluble cellulose mixed ether and the salt; and adjusting the pH of the solution to the value required for gel formation.

10. A process as claimed in claim 9, further comprising the step of adding a buffering salt before gel-formation.

11. A process as claimed in claim 9, comprising adding the salt in solid form to an aqueous solution of the mixed ether.

12. A process as claimed in claim 9, comprising premixing the salt in solid form with the mixed ether in solid form and subsequently forming an aqueous solution therefrom.

13. A process as claimed in claim 12, comprising adding a buffer salt in solid form in the premixing step.

14. A process for the reversible reversal of a gel prepared as claimed in claim 9, which process comprises the steps of adding to the gel an amount, which stoichiometrically is at least equal to the gel's content of multivalent cation, of an agent which complexes the cation at the preselected pH value of the gel while producing at most only a small effect on the pH value.

15. A process as claimed in claim 14, comprising adding an amount of fluoride ions in the form of an aqueous solution of an alkali metal fluoride or ammonium fluoride to the gel, wherein the gel contains $Al^{3+}$ ions, $Fe^{3+}$ ions, $Zr^{4+}$ ions or $ZrO^{2+}$ ions as the multivalent cation.

16. A process for the secondary production of petroleum, comprising the steps of injecting into an underground formation a gel-forming composition as defined by claim 1 and causing said composition to gel while in said formation.

* * * * *